United States Patent Office 3,208,872
Patented Sept. 28, 1965

3,208,872
CARBIDE COATINGS ON GRAPHITE
Filmore F. Criss and Cornel Wohlberg, Los Alamos, N. Mex., assignors to the United States of America as represented by the United States Atomic Energy Commission
No Drawing. Filed Dec. 31, 1956, Ser. No. 631,979
5 Claims. (Cl. 117—95)

This invention relates to methods of coating graphite with bonded layers of metal carbide and in particular to coating graphite with bonded layers of columbium, tantalum or vanadium carbide.

In many uses of graphite, wherein the high temperature property of graphite is a necessary condition for its use as a material, the graphite surface does not exhibit sufficient corrosion resistant properties to be useful in the particular application. This is true, for example, where fluids move across the surface of the graphite with high volume and velocity and wear or corrode the graphite surface. This problem has been recognized in gas cooled nuclear reactors and it is important, therefore, that a means be found suitable for protecting the graphite surface. This protective means must also be a material which can stand high temperatures, have good mechanical properties at high temperatuers, and have good neutronic characteristics.

It has been found that columbium, tantalum and vanadium carbide have these properties. By this invention it has been found possible to place a uniform coating of columbium, tantalum or vanadium on a graphite surface with a method which is easy to practice yet forms a very reliable coating. Further this method may be applied for coating the inside surface of long, thin tubes which have hereinbefore been extremely difficult, if not impossible, to do.

It is therefore an object of this invention to provide a means for coating graphite bodies with tenaciously bound coats of columbium, tantalum or vanadium carbide.

Another object of this invention is to provide a method for coating the inside surface of long, thin graphite tubes with tenaciously bound coatings of columbium, tantalum and vanadium carbide.

To practice this invention an oxide of either columbium, tantalum, vanadium or a combination thereof is prepared in a powder form. The size of the powder grains is not important, however it has been found that about pass 320 mesh is preferable because of ease of handling. The oxide is placed on or near the piece of graphite which is to be coated and the piece is then placed in a graphite tube having one end closed and the opening to the other end restricted. The graphite tube is then fed through a high temperature furnace at a rate of several inches per minute. The front end of the tube should be in the hot region of the furnace when the rear end of the tube enters the furnace, so the furnace must be at least as long as the tube. The temperature of the furnace must be high enough to decompose the oxide and cause the formed vapor to react with the graphite to form a metal carbide. About 2300° C. has been found to be the preferred temperature.

If it is desired to coat the inside surface of a tube, the walls of the tube, will, of course, be the confining container. In this case, the tube should be packed with powder along its length in a volume ratio of about .03 cc. of powder to 5 mm. of circumferential length per linear cm.

*Example I*

To coat, for example, a graphite tube having a $\frac{1}{16}$ inch diameter hole and about 36 inches long, the hole in the tube is packed with oxide tightly enough so that the powder will not fall out if the tube is placed vertical. The oxide is any one of the aforementioned metals of pass 320 mesh size. The rear opening of the tube is sealed with a graphite plug and the front opening is reduced to a controlled leak with a graphite plug having a hole in it. For this size tube the controlled leak is 30 mils in diameter times $\frac{1}{8}$ inch long, if a coating of about 3 to 4 mils thickness is desired.

The furnace which has a hot region at least 36 inches long is filled with an inert gas such as argon and raised to a temperature of 2300° C. Now the tube is passed through the furnace at a constant rate of 2 inches per minute and unter these conditions a homogeneous uniform coating of a metal carbide will form on the inside surface of the graphite tube. If a coating of about 1 mil thickness is desired, the temperature of the furnace should be about 2400° C. with all other conditions the same.

*Example II*

To coat, for example, a graphite tube having a $\frac{1}{8}$ inch diameter hole and about 36 inches long, the hole in the tube is loosely packed with oxide. The rear opening of the tube is sealed with a graphite tube and the front opening is reduced to a controlled leak about 60 mils in diameter times $\frac{1}{8}$ inch long if a coating of about 3 to 4 mils thickness is desired.

This is passed through the furnace under conditions similar to Example I.

It should be noted that when coating by the method described in Example I or II, that the rear opening of the tube, for about 3 inches in length, does not coat very well if at all. This problem can be circumvented by either starting with a tube 3 inches longer than necessary and then cutting it off or by repacking the tube and re-cycling it through the furnace with the openings unchanged on the second cycle. This procedure however will tend to give a metallic-like surface to the carbide coat as described in Example III.

The exact phenomenon which causes the oxide to produce a metal carbide coating is not thoroughly understood but it is believed that the metal oxide decomposes and converts to carbide on hot graphite surfaces. It has been found that heavy layers of metal carbide hold more tenaciously than thin layers and are more protective against high velocity streams of gas such as high velocity (500 ft./sec.) ammonia at a temperature of 2500° C.

It has also been found that a layer may be formed having carbide properties near the graphite surface and metal-like properties on the outside surface of the protective coating. This type protective coating may be formed by passing the graphite tube through the furnace to first form a carbide coating, then repacking with oxide and passing through the furnace to form a new layer on the carbide surface which has almost metal-like properties because of the small amount of graphite available to this new layer. If the first or carbide layer is thick, the graphite tube is passed through the furnace at the same rate as used to form the carbide coating, i.e., about 2 inches per minute. However, if the original carbide coating is thin it is necessary to pass the tube through the furnace at a faster rate in order to retain the metal-like characteristic of the second coating.

Analyses have shown that this two layer process results in a homogeneous carbide layer having a greater quantity of graphite combined with the metal near the graphite surface and progressively less graphite combined with the metal the greater the distance from the graphite surface.

*Example III*

For example, to coat the same before mentioned 1/16 inch inside diameter tube with a metal layer over the carbide, the tube is first internally coated with the metal carbide by the method of Example I. If the tube was first treated at 2300° C. and thus has a coating of carbide of 3 to 4 mils thick, it is packed with the oxide and passed through the furnace at a rate of 2 inches per minute at 2300° C. If the tube had originally been passed through the furnace at 2400° C. it consequently has a coating thickness of about 1 mil and must be passed through the furnace at the rate of about 4 inches per minute at 2200° C.

As hereinbefore mentioned, combinations of the oxides will work equally well although any composition combination has been found to work satisfactorily. A mixture of 80 parts columbium oxide to 20 parts vanadium oxide seems to be particularly good.

*Example IV*

To coat a 1/16 inch inside diameter tube 36 inches long with an 80 percent columbium carbide and 20 percent vanadium carbide composition, pack the tube well as before with a powder consisting of 80 percent columbium oxide and 20 percent vanadium oxide. Pass the tube through a furnace at a rate of 2 inches per minute as hereinbefore described with one end of the tube closed and one end restricted. The desired coating will be produced having the same metal carbide composition as represented by the original oxide mixture.

The particular oxide of the three metals used in the preferred embodiment of this invention are:

(1) Columbium oxide, $Cb_2O_5$,
(2) Tantalum oxide, $Ta_2O_5$,
(3) Vanadium oxide, $V_2O_3$.

However, it must be understood that other oxides will work equally well as, for example, the black columbium oxide or the yellow vanadium oxide.

Other changes may be made by those skilled in the art which are realized to be within the scope of this invention. For example, instead of filling the tube with a powder, the oxide may be prepared as an extruded piece of rod and pushed into the tube to thus fill the tube with oxide. If desired, about 1 percent to 10 percent graphite flake or powder may be added to the oxide powder to increase the carbon content of the deposited carbide layer.

In order to practice this invention it is not necessary to prepare the graphite surface in any way. However, it is realized that the bond of the protective coating could not be stronger than the surface to which it is bonded and that certain graphite surfaces are inherently stronger than others. It has been found that the method of this invention works equally well for all three metals when the graphite is pure.

Therefore, the invention is not limited by the preferred embodiment or by the theory suggested, but is limited only by the appended claims.

What is claimed is:

1. The method of coating the inside surface of a graphite tube with a metal carbide comprising the steps of filling the tube cavity with a metal oxide, closing the rear opening of said graphite tube and limiting the size opening to the front of said tube, filling a furnace with inert gas, heating said furnace to at least the temperature of decomposition of said oxide, pasisng said tube through said furnace at a uniform rate of about 2 inches per minute and adjusting the hot region of said furnace so that said front opening of said tube is within the hot region of said furnace when said rear opening of said tube enters said hot region, said oxide selected from at least one of the class consisting of $Cb_2O_5$, $Ta_2O_5$ and $V_2O_5$.

2. The method of claim 1 wherein said metal oxide is columbium oxide.

3. The method of claim 1 wherein said metal oxide is tantalum oxide.

4. The method of claim 1 wherein said metal oxide is vanadium oxide.

5. The method of claim 1 wherein said metal oxide is a mixture of 80 percent columbium oxide and 20 percent vanadium oxide.

References Cited by the Examiner

UNITED STATES PATENTS

| | | | |
|---|---|---|---|
| 912,245 | 2/09 | Kuzel | 117—228 |
| 1,019,394 | 3/12 | Weintraub | 75—84.1 |
| 2,030,695 | 2/36 | Erber | 117—228 |
| 2,548,897 | 4/51 | Kroll | 22—250 |

OTHER REFERENCES

Refractory Hard Metals, Schwarzkopf et al., The MacMillan Co., New York (1953), pp. 47, 56, 101–103, 108, 109 and 112–117.

RICHARD D. NEVIUS, *Primary Examiner.*

WILLIAM G. WILES, ROGER L. CAMPBELL, LEON D. ROSDOL, *Examiners.*